May 15, 1923.  1,455,162
J. BLACKBURN
GEAR SELECTING AND SHIFTING DEVICE FOR MOTOR VEHICLES
Filed Feb. 7, 1920  4 Sheets-Sheet 1
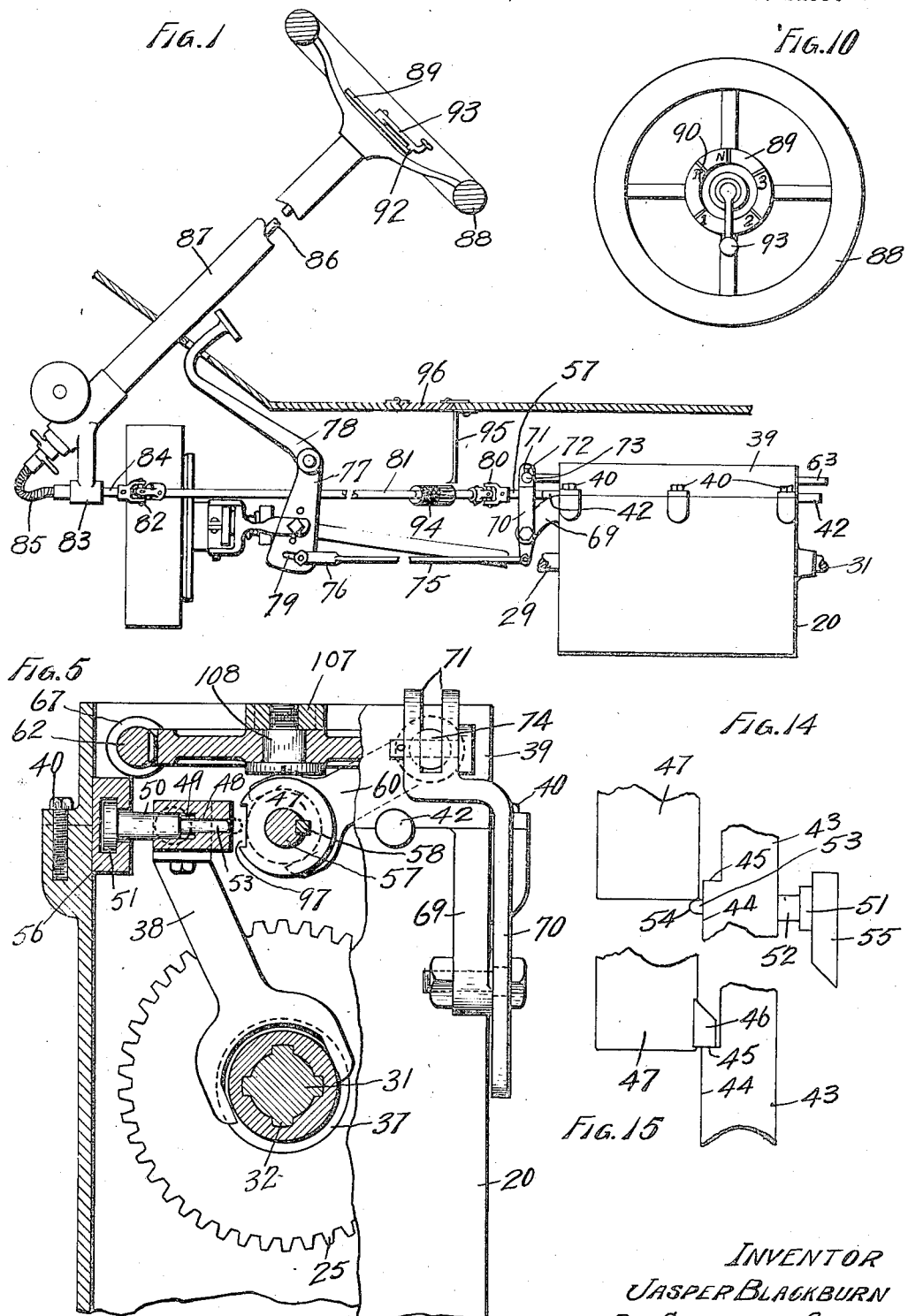
INVENTOR
JASPER BLACKBURN
BY Edward E. Longan
ATTY.

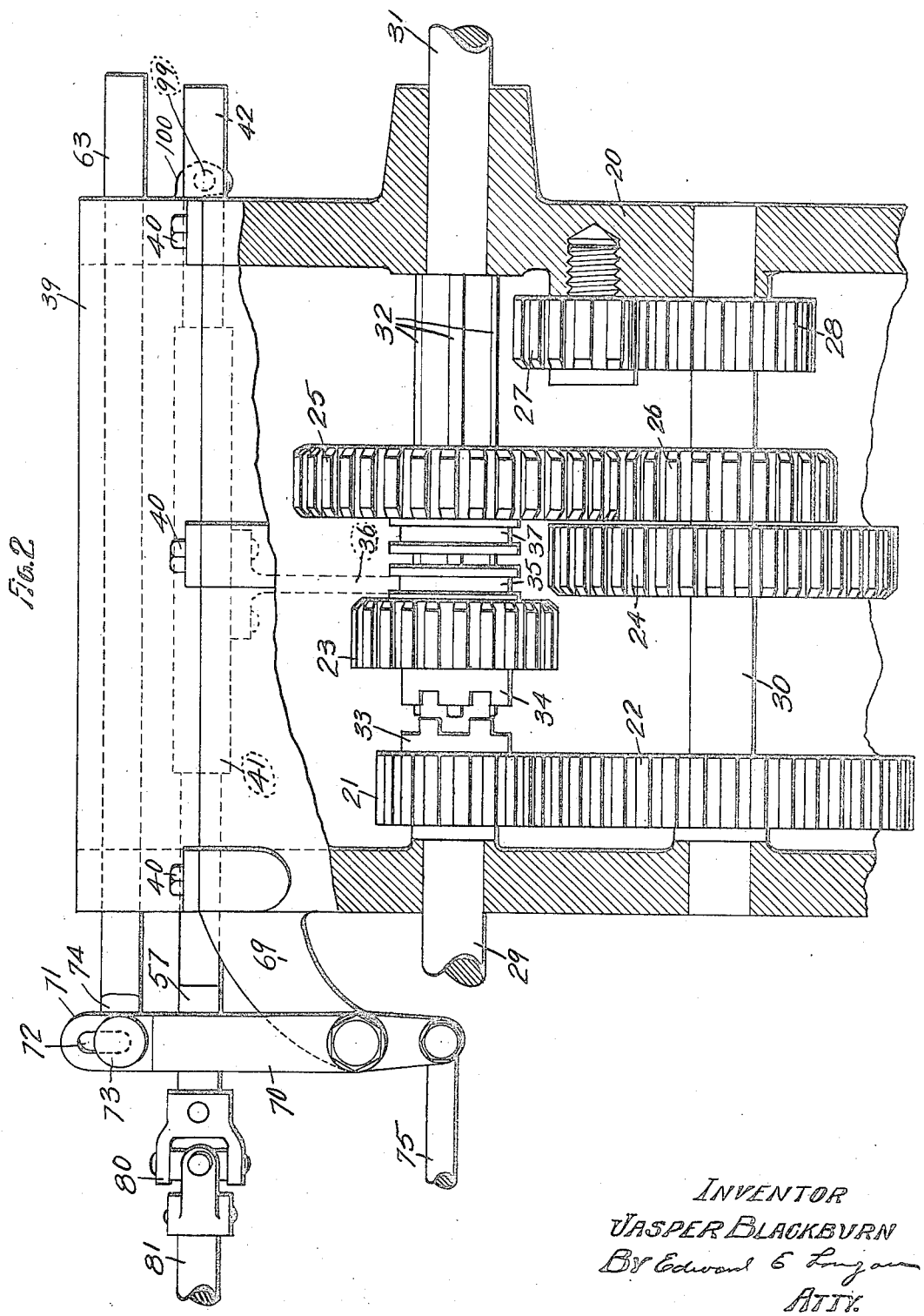

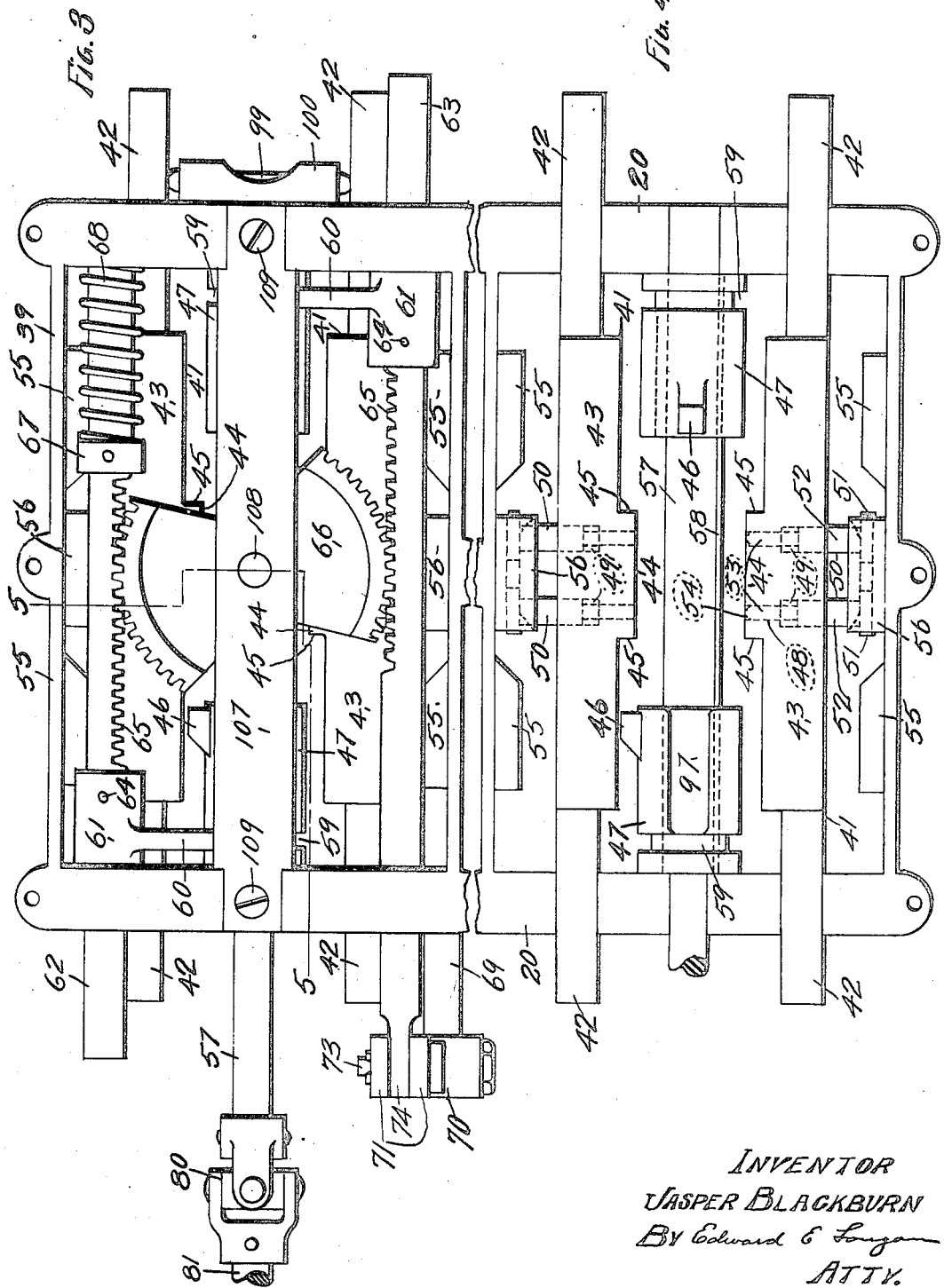

May 15, 1923. 1,455,162
J. BLACKBURN
GEAR SELECTING AND SHIFTING DEVICE FOR MOTOR VEHICLES
Filed Feb. 7, 1920 4 Sheets-Sheet 4
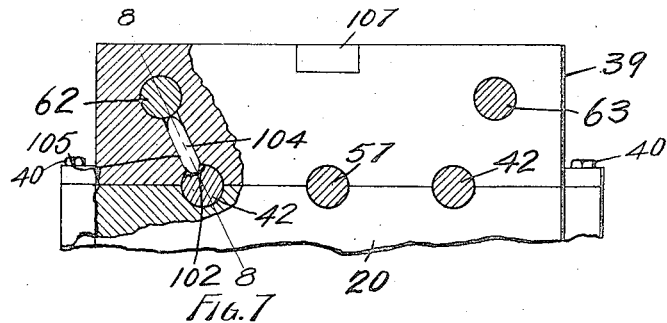
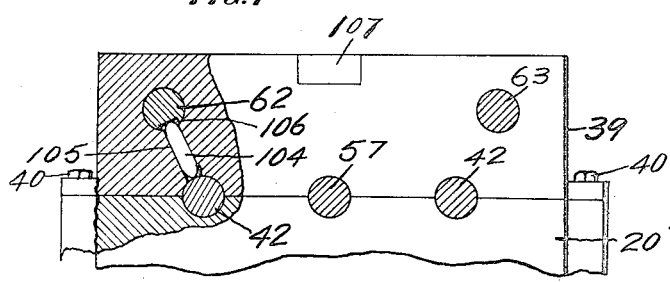
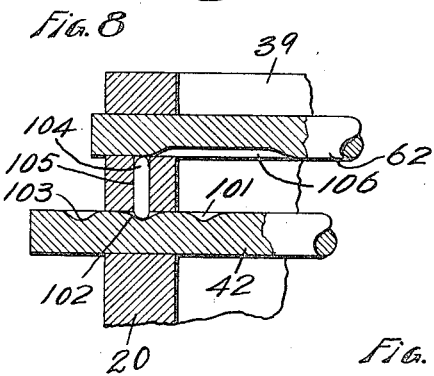
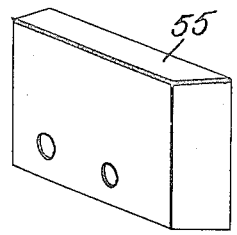
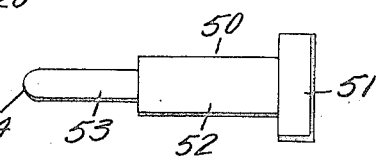
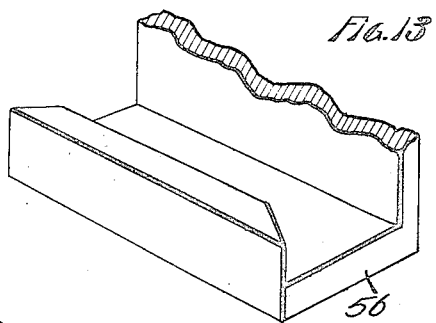
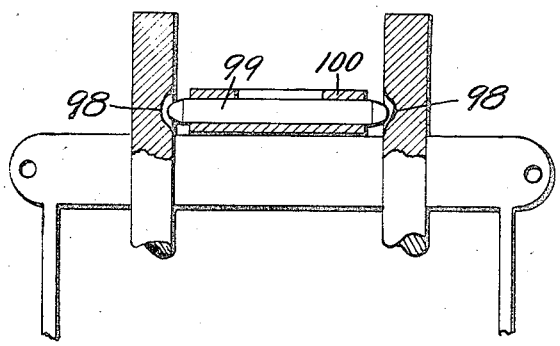
INVENTOR
JASPER BLACKBURN
By Edward E. Longan
ATTY.

Patented May 15, 1923.

1,455,162

UNITED STATES PATENT OFFICE.

JASPER BLACKBURN, OF WEBSTER GROVES, MISSOURI.

GEAR SELECTING AND SHIFTING DEVICE FOR MOTOR VEHICLES.

Application filed February 7, 1920. Serial No. 357,032.

*To all whom it may concern:*

Be it known that I, JASPER BLACKBURN, a citizen of the United States of America, and a resident of Webster Groves, in the county of St. Louis and State of Missouri, have invented certain new and useful Improvements in Gear Selecting and Shifting Devices for Motor Vehicles, of which the following is a specification, containing a full, clear, and exact description, reference being had to the accompanying drawings, forming a part thereof.

This invention relates to improvements in gear selecting and shifting devices, and has for its primary object a selecting device which is controlled from the steering wheel so that the gears may be set at any desired speed and then shifted by movement of the clutch operating pedal.

A further object is to construct a gear selecting and shifting device so that it is necessary to disengage the clutch entirely before any shifting of gears can take place, and thus eliminate the danger of stripping the gears which frequently happens when an attempt is made to shift gears while the clutch is in engagement.

In the drawings,

Fig. 1 is a side view of my device showing the same in position underneath the floor of a motor vehicle;

Fig. 2 a side elevation of the transmission with my shifter in position;

Fig. 3 a top plan view of the shifting mechanism;

Fig. 4 a top view of the shifting mechanism with the upper portion removed;

Fig. 5 a sectional view taken on the line 5—5 of Fig. 3;

Fig. 6 an end view of the shifting mechanism with parts broken away and in section, showing the shifter bar in locked position;

Fig. 7 a similar view showing the shifter bar in unlocked position;

Fig. 8 a longitudinal sectional view through the shifter bar locking mechanism taken on the line 8—8 of Fig. 7;

Fig. 9 a horizontal sectional view of the locking mechanism located on the rear of the transmission case for holding the shifting bars in position;

Fig. 10 a top plan view of a steering wheel with the selector dial and lever in position;

Fig. 11 a perspective view of one of the pin operating lugs made use of for operating the shifter bars;

Fig. 12 a side elevation of one of the pins used in the shifter bar;

Fig. 13 a fragmental perspective of the block made use of for withdrawing the pin in the shifter bar;

Fig. 14 a diagrammatic view showing the operation of the pin in the shifter bar; and Fig. 15 a diagrammatic view of the means employed for operating the shifter bar to throw the gears in mesh.

In the construction of my device I employ the gear case 20 in which are located the gears 21, 22, 23, 24, 25, 26, 27 and 28. The gear 21 is connected directly to the engine shaft 29 and meshes with the gear 22 which is secured to the counter shaft 30. On this counter shaft the gears 24, 26 and 28 are also secured. Within the casing and extending rearwardly therethrough is the shaft 31, this shaft driving the differential which is located on the rear axle of the machine. That portion of the shaft 31 which is within the casing 20 is splined as indicated by the numeral 32, and on this portion of the shaft the gears 23 and 25 are slidably mounted.

The gear 21 is provided on its face adjacent the gear 23 with a toothed hub 33. The gear 23 is provided with a toothed hub 34 which is adapted to engage with the teeth formed on the hub 33. When the gear 23 is shifted so that the teeth on the hubs 33 and 34 engage, the gear is in high. The gear 23 is provided on its opposite face with a recessed hub 35 into which a fork 36 fits. The gear 25 is provided on its face adjacent the gear 23 with a similar recessed or grooved hub 37 into which the fork 38 is adapted to fit.

The upper portion 39 of the casing 20 is made removable from the casing proper and is secured thereto by means of the bolts 40. Within the upper portion of the casing 20 and the lower portion of the casing 39 are secured the shifter bars 41. These shifter bars are provided with rounded ends 42 and a flat portion 43. The flat portion 43 is provided central its length with an extension 44, thus forming the shoulders 45 with which the lugs 46 of the shifter sleeves 47 contact. Within the portion 44 of the shifter bars 41 is provided a bore 48, one portion of which is enlarged as at 49, and within this bore is located the pin 50, this pin being provided with a head 51, a cylindrical portion 52 and a reduced cylindrical end 53, the end 53 being rounded at its end as indicated by the numeral 54.

Within the casing and secured to the walls thereof are the shifting blocks 55 and 56, the purpose of which is to force out or withdraw the ends 53 of the pins 50 from the surface of the shifter bar nearest the center of the housing.

Mounted centrally of the housing and extending lengthwise therethrough is a shaft 57. This shaft is provided with a key 58, and on this shaft the shifter sleeves 47 are mounted. The shifter sleeves 47 are provided near their outer ends with the groove 59 into which forks 60 fit. These forks are provided with cylindrical projections 61 through which shafts 62 and 63 project, and are secured thereto by means of pins 64. The shafts 62 and 63 are provided for a portion of their length midway between the ends with teeth 65; these teeth meshing with a double gear segment 66. This segment is so arranged that when one shaft is moved in one direction the other shaft will move in the opposite direction.

Secured on the shaft 62 is a collar 67, and between this collar and the end wall of the casing 39 is a spring 68, this spring tending to normally hold the sleeves 47 against the opposite ends of the casing; the end of the casing 20 nearest the front of the machine is provided with an outwardly extending lug 69, and on this lug is pivotally mounted the lever 70, its upper end being bifurcated as at 71. This bifurcation is provided with a slot 72 through which a pin 73 passes.

The end 74 of the shaft 63 is flattened and provided with an opening through which the pin 73 also passes. The lower end of the lever 70 is pivotally attached to the rod 75, this rod 75 being forked at its end opposite the lever 70 as indicated by the numeral 76. This forked portion is adapted to straddle the downward projection 77 formed on the clutch operating lever 78. The portion 77 is provided with a slot 79. The purpose of this slot is that the clutch can be disengaged without disturbing the gear shifting mechanism. This is necessary when driving the car in heavy traffic, as it is not desired in this instance to throw the gears out of mesh. The shaft 57 extends forward through the casing and is provided on its projecting end with a universal coupling 80. To this coupling is attached one end of a shaft 81, the other end of the shaft 81 being attached to a second universal coupling 82. This universal coupling is held in position by means of a bracket 83 through which the other shaft 84, forming a part of the universal coupling 82, extends. Secured to the shaft 84 is a flexible shaft 85 which is in turn attached to a rod 86 passing through the steering post 87 of an automobile. Secured to the upper end of the steering post 87 is the steering wheel 88, and within the periphery of this wheel and around the shaft 86 is secured the ring 89, which ring is provided with shallow grooves 90 into which the tongue 92 of the selecting handle 93 seats itself. The selecting handle 93 is secured to the shaft 86 and revolves therewith while the ring 90 remains stationary.

In the event that the flexible shaft 85 should be broken I provide a cylindrical sleeve 94 which is primarily attached to the shaft 81, this sleeve being knurled for a portion of its distance only, the other portion is left smooth, and on this smooth portion the same figures are stamped as on the ring 90.

Projecting from the bottom of the body and in close proximity to the sleeve 94 is an indicating finger 95, and in the floor of the car and directly above the sleeve 94 is placed a hinged door 96 so that the selecting device can be operated in event of any trouble between the shaft 81 and the selecting lever 93.

Each of the shifter sleeves 47 is provided with a longitudinal groove 97. As will be seen from Fig. 4, these grooves are so arranged that the groove in one sleeve is opposite the projection of the other. The purpose of this is that one of the pins 50, which is pushed out when the shifter bars 41 are moved, will pass into this groove as both of the shifter sleeves 47 move towards each other. This can be readily seen in Fig. 4, as when the bar 41 is being shifted toward the rear of the casing, the two shifter sleeves come together. The lug 46 engages one of the shoulders 45 on the bar 41, moving the bar backward. The head 51 of the pin 50 comes in contact with the shifter block 55 and forces the end 53 of the pin out from the face of the shifter bar. This pin will then assume the position as shown by dotted lines in Fig. 5, and it is clearly shown in this view how this slot allows the shifter sleeve to slide past the pin without touching it.

The ends 42 of the shifter bars 41 are provided at their rear end with a recess 98 into which a pin 99 is adapted to seat itself. This pin is slidably carried by a perforated projection 100 formed on the rear end of the casing 20. This pin is slightly longer than the distance between the two portions 42 of the shifter bars 41, and when one of the bars is moved in either direction the pin 99 will be forced into the recess of the bar opposite. This will prevent the opposite bar from being moved until the first mentioned bar is again brought into the position indicated in Fig. 9.

The opposite ends 42 of the shifter bar 43 are provided with three depressions, 101, 102 and 103 into which a pin 104 is adapted to seat itself. This pin is loosely mounted in a bore 105 which is located in the portion 39 of the casing. This bore extends from the bearing of the shafts 62 and 63 into the bearing for the ends 42 of the shifter bar 41, and is for the purpose of locking the shifter bars in set position, that is, to hold the bars against accidental shifting due to road jolts.

The shafts 62 and 63 are provided with an elongated longitudinal groove 106, the purpose of which is to permit the pins 104 to rise upwardly therein, while the gears are being shifted. This operation is clearly shown in Fig. 8, as when the shaft 62 is moved forward the groove 106 will come over the pin 104, then as this movement continues and one of the lugs or projections 46 are brought in contact with one of the shoulders 45 formed on the shifter bar on that side of the casing, the pin can rise out of the depression 102 and drop into either the depression 101 or 103 according to which way the shifter bar is operated, and upon the pedal being released so that the clutch again engages, the shaft 62 travels back into the position shown in Fig. 8, thus securely locking the shifter bar against accidental movement. The double segment 66 is secured to the bar 107 by means of the stud 108, this stud extending longitudinally and centrally of the casing along its upper edge, and the bar is countersunk in each end of the casing so as to be flush with the top, see Figs. 3, 6 and 7, and is held in position by means of screws 109.

The operation of my device is as follows: the shifting mechanism being set at neutral as indicated in Fig. 2, the engine is started, and when it is desired to reverse the automobile or in other words drive it backward, the selector handle 93 is moved to the notch marked R. This will impart rotation to the shaft 86 extending through the steering column, thence through the flexible shaft 85 and shafts 81 and 84 to the shaft 57. This will turn the forward shifting sleeve 47 into the position indicated in Figs. 3 and 4, and the rear shifting sleeve into the position indicated in Figs. 3 and 4. The clutch pedal 73 is then operated so as to release the clutch, and during this operation the lower end 77 of the clutch pedal travels backward and communicates its motion to the shaft or rod 75 which will in turn rock the lever 70 on the pivot extending through the arm 69. This will draw the shaft 63 forward and the teeth formed thereon will cause the segment 66 to turn, thus imparting a backward movement to the shaft 62. This opposite movement of the shafts is transferred to the forked arms 60 which move the shifter sleeves 47 toward the center.

When the projection 46 formed on the forward shifter sleeve comes in contact with the shoulder 45 formed on the shifter bar 41, this bar is moved backward, carrying with it the gear 25 which will be brought in mesh with the gear 27. This will cause the shaft 31 to turn in the opposite direction than the engine is turning and consequently drive the machine backward. During this operation of moving the shifting bar 41 the head 51 of the pin 50 comes in contact with the lug 55 which forces the pin out through the inner face of the shifter bar 41.

The slot in the rear shifter collar being opposite the pin allows it to project from the face of the bar and not come in contact with the sleeve.

When it is desired to again throw the machine into neutral, the selector handle is moved into a notch which will be marked N, and the clutch thrown out. This will bring the shifter sleeves forward, and when the handle is so turned as to be in the neutral notch, the shifter sleeves are so turned that neither the recess or slot 97 nor the projection 46 will be opposite either of the shifter bars. This will allow the inner face of the shifter sleeve to come in contact with the projecting end of the pin 50 and force the shifter bar 47 forward. As this is done the head 51 leaves the projection 53 and the inner face of the head comes in contact with the inclined face of the pin shifting lug 56 which withdraws the pin so that it will be slightly below the surface of the shifter bar. This operation is the same for the different speeds. The shifter bar under the shaft 62 when moving forward throwing the car into first or low speed, when moving backward into reverse, the shifter bar under the shaft 63 when moving backward throwing the car into second or intermediate speed and when moving forward into high or direct drive.

It is to be understood of course that when the gears are shifted into either neutral or in mesh, the pin 105 positively locks the shifter bars against accidental movement due to road shocks. This accidental jolting and shifting of gears has been found a common fault where spring actuated plungers are used, as there is always a possibility of the jolt being sufficiently strong to jar the spring and cause it to momentarily unseat itself and allow the gears to slip. With my locking feature this is impossible because the shafts 62 and 63 will have to move quite a distance before the groove 106 formed therein will allow the pin upward movement so that it can release itself from the depression in which it is seated.

I may if desired dispense with the collar 67 and spring 68 and rely solely on the spring which operates the clutch to move the rods 62 and 63. In this way there will be no springs whatever used in the transmission casing, nor any additional springs on the car in any place for operating these rods.

Having fully described my invention, what I claim is:

1. In a device of the class described comprising a sliding gear transmission, a casing surrounding said transmission, a second casing secured to the upper end of said first mentioned casing, a pair of sliding bars having projections mounted in second mentioned casing, a splined shaft mounted central of the second mentioned casing and between the sliding bars, sleeves slidably mounted on said shaft and rotatable therewith lugs formed on the sleeves, said lugs adapted to come in contact with the projections formed on the sliding bars a pair of rods mounted in the second mentioned casing, means interposed between the rods for moving the same in opposite directions simultaneously, means for connecting the rods and movable sleeves so as to impart motion to the sleeves, a preselecting device mounted on the steering column of an automobile, a flexible shaft connection extending from the preselecting device through the steering column and connected to the shaft, a lever mechanism for operating one of said movable rods in combination with an engine and its clutch, and means for simultaneously operating the lever by the disengagement of the engine clutch.

2. In a device of the class described comprising a sliding gear transmission, a casing surrounding said transmission, a second casing secured to the upper end of said first mentioned casing, a pair of sliding bars having projections mounted in second mentioned casing, a splined shaft mounted central of the second mentioned casing and between the sliding bars, sleeves slidably mounted on said shaft and rotatable therewith, lugs formed on the sleeves, said lugs adapted to come in contact with the projections formed on the sliding bars, a pair of rods mounted in the second mentioned casing, a rack and segment mechanism for operating the rods in opposite directions simultaneously, means for connecting the rods and movable sleeves so as to impart motion to the sleeves, a preselecting device mounted on the steering column of an automobile, a flexible shaft connection extending from the preselecting device through the steering column and connected to the shaft, a lever mechanism for operating one of said movable rods in combination with an engine and its clutch, and means for simultaneously operating the lever by the disengagement of the engine clutch.

3. In a device of the class described comprising a sliding gear transmission, a casing surrounding said transmission, a second casing secured to the upper end of said first mentioned casing, a pair of sliding bars having projections mounted in second mentioned casing, a splined shaft mounted central of the casing and between the sliding bars, sleeves slidably mounted on said shaft and rotatable therewith, lugs formed on the sleeves, said lugs adapted to come in contact with the projections formed on the sliding bars, a pair of rods mounted in the second mentioned casing, means interposed between the rods for moving the same in opposite directions simultaneously, means for connecting the rods and movable sleeves so as to impart motion to the sleeves, a preselecting device mounted on the steering column of an automobile, a flexible shaft connection extending from the preselecting device through the steering column and connected to the shaft, a lever mechanism for operating one of said movable rods in combination with an engine and its clutch, means for locking the shifting bars in set position, and means for simultaneously operating the lever by the disengagement of the engine clutch.

4. A gear selecting and shifting device for motor vehicles comprising the combination of a clutch, its operating lever, and the steering wheel and column, of a gear casing, a plurality of fixed gears rotatably mounted in said casing, a pair of sliding gears rotatably mounted in said casing, a pair of shifting bars slidably mounted in said casing, means attached to the shifting bars for imparting longitudinal movement to the sliding gears, a shaft rotatably mounted in the casing midway between the shifting bars, sleeves slidably mounted on said shaft and rotatable therewith, projections formed on said sleeves, said projections adapted to come in contact with and operate the shifting bars, pins carried by the shifting bars, means carried by the casing for projecting and withdrawing the pins from the inner faces of the shifting bars, said pins adapted to come in contact when projected with the inner ends of the sleeves and operate the shifting bars, a pair of sliding rods mounted in the casing, means carried by the casing for moving the rods in opposite directions, means for connecting the sleeves and rods in pairs so as to move the sleeves in opposite directions, locking means carried by the casing for holding the shifting bars against accidental movement, means connected to one of the sliding rods and clutch lever for operating the clutch and rod simultaneously, a dial located on the steering column, a shaft extending through the steering column, an operating handle mounted on the upper end of said shaft and above the dial, and means for connecting the lower end of said rod with the sleeve carrying shaft for imparting rotation to said shaft.

5. A gear selecting and shifting device for motor vehicles comprising the combination of a clutch, its operating lever, and the steering wheel and column, of a gear casing, a plurality of fixed gears rotatably mounted in said casing, a pair of sliding gears rotatably mounted in said casing, a pair of shifting bars slidably mounted in said casing, means attached to the shifting bars for imparting longitudinal movement to the sliding gears, a shaft rotatably mounted in the casing midway between the shifting bars, sleeves slidably mounted on said shaft and rotatable therewith, projections formed on said sleeves, said projections adapted to come in contact with and operate the shifting bars, pins carried by the shifting bars, means carried by the casing for projecting and withdrawing the pins from the inner faces of the shifting bars, said pins adapted to come in contact when projected with the inner ends of the sleeves and operate the shifting bars, a pair of toothed sliding rods mounted in the casing, a double segment carried by the casing for moving the rods in opposite directions, means for connecting the sleeves and rods in pairs so as to move the sleeves in opposite directions, locking means carried by the casing for holding the shifting bars against accidental movement, means connected to one of the sliding rods and clutch lever for operating the clutch and rod simultaneously, a dial located on the steering column, a shaft extending through the steering column, an operating handle mounted on the upper end of said shaft and above the dial, and means for connecting the lower end of said rod with the sleeve carrying shaft for imparting rotation to said shaft.

6. A gear selecting and shifting device for motor vehicles, embodying therein an engine clutch, means operative to set and release said clutch, a pair of shifting bars adapted to impart sliding movement to the movable member of a transmission gear system, a pair of slidably mounted sleeves simultaneously movable in opposite directions adapted to contact with and move said bars, a shaft on which said sleeves are mounted, means for operating the shifting bars in opposite directions comprising a pair of shafts capable of simultaneous movement for operating said sleeves, a connection between said shafts and the clutch operating means, whereby upon the release of the clutch the sleeve operating shafts are moved in opposite directions at the same time, and a pre-selecting and indicating device operable through the steering column of the machine and above the steering wheel thereof for setting said sleeves to the desired speed and direction, and means for locking both of the gear shifting bars in the set position against accidental movement.

7. In a gear selecting and shifting device, the combination with a sliding gear transmission, a pair of gear shifting bars, a shaft, sleeves mounted on said shaft rotatable therewith and capable of longitudinal movement simultaneously and in opposite directions, means for imparting longitudinal movement to said sleeves, means carried by said sleeves for contacting with and operating the shifting bars, and a selecting and indicating means operable through the steering column of the machine and above the steering wheel thereof, and a flexible connection between the shaft on which the sleeves are mounted and the selecting and indicating means.

8. In a gear selecting and shifting device, the combination with a sliding gear transmission, a pair of gear shifting bars, a shaft, sleeves mounted on said shaft rotatable therewith and capable of longitudinal movement simultaneously, lugs formed on said sleeves for engaging the shifter bars, pins mounted in the shifter bars and capable of extension through the face thereof, means for extending and withdrawing said pins for engagement with and disengagement from the inner face of the sleeves, said sleeve having slots formed therein, said slots adapted to allow the sleeve to pass the extended pin without contacting therewith, and a selecting and indicating means operable through the steering column of the machine and above the steering wheel thereof, and a flexible connection between the shaft on which the sleeves are mounted and the selecting and indicating means.

9. In a gear selecting and shifting device, the combination with a sliding gear transmission, a casing surrounding said gear transmission, a pair of gear shifting bars mounted in said casing, a shaft mounted in said casing, sleeves mounted on said shaft rotatable therewith and capable of longitudinal movement simultaneously and in opposite directions, and a selecting and indicating means operable through the steering column of the machine and above the steering wheel thereof, and a flexible connection between the shaft on which the sleeves are mounted and the selecting and indicating means.

10. In a gear selecting and shifting device for motor vehicles, a sliding gear transmission, gear shifting bars mounted adjacent the transmission, a rotatable shaft mounted between said gear shifting bars, sleeves provided with lugs and grooves slidingly and non-rotatably mounted on said shaft adapted to be brought into engagement with the gear shifting bars for operating the same, a pair of sleeve shifting bars, a double segment connection between the same, a clutch lever and a connection between one of the sleeve shifting bars and the clutch lever for operating the same simultaneously and in opposite directions, a steering column, a steering wheel, indicating means mounted above the steering wheel for indicating the direction and speed of the machine, and a connection passing through the steering column and connected to the indicating means and the shaft on which the rotating and sliding sleeves are mounted.

11. In a gear selecting and shifting device for motor vehicles, a sliding gear transmission, gear shifting bars mounted adjacent the transmission, a rotatable shaft mounted between said gear shifting bars, sleeves provided with lugs, slidingly and non-rotatably mounted on said shaft adapted to be brought into engagement with the gear shifting bars for operating the same, a pair of sleeve shifting bars, a connection between the same, a clutch lever and a connection between one of the sleeve shifting bars and the clutch lever for operating the same simultaneously and in opposite directions, a steering column, a steering wheel, indicating means mounted above the steering wheel for indicating the direction of speed of the machine, and a connection passing through the steering column and connected to the indicating means and the shaft on which the rotating and sliding sleeves are mounted.

12. In a gear selecting and shifting device, the combination with a sliding gear transmission, a pair of gear shifting bars, a shaft, sleeves for operating said shifting bars mounted on said shaft rotatable therewith and capable of longitudinal movement simultaneously means for longitudinally moving said sleeves, and in opposite directions, and a selecting and indicating means, and a flexible connection between the shaft on which the sleeves are mounted and the selecting and indicating means.

13. In a gear selecting and shifting device, the combination with a sliding gear transmission, a pair of gear shifting bars carried thereby, a splined shaft, sleeves for operating the gear shifting bars mounted on said shaft and rotatable therewith, said sleeves capable of longitudinal movement simultaneously and in opposite directions, means for imparting a longitudinal movement to said sleeves a hand operated selecting and indicating means extending through the steering column of the machine and above the steering wheel thereof, and a connection between the shaft on which the sleeves are mounted and the selecting and indicating means.

14. In a gear selecting and shifting device, the combination with a sliding gear transmission, a pair of gear shifting bars carried loosely, a shaft, sleeves mounted on said shaft rotatable therewith and capable of longitudinal movement simultaneously and in opposite directions for operating the gear shifting bars, means for imparting longitudinal movement to said sleeves, a selecting and indicating means operable through the steering column of the machine, a flexible connection between the shaft on which the sleeves are mounted and the selecting and indicating means, and means for operating the sleeves longitudinally.

15. In a gear selecting and shifting device, the combination with a sliding gear transmission, a clutch and a clutch lever, a pair of gear shifting bars, a shaft, sleeves mounted for contacting with and operating said gear shifting bars on said shaft rotable therewith and capable of longitudinal movement in opposite directions simultaneously, means for imparting longitudinal movement to said sleeves, a selecting and indicating means operable through the steering column of the machine and above the steering wheel thereof, a connection between the shaft on which the sleeves are mounted and the selecting and indicating means, and a connection between the clutch lever and the sleeves for operating the same.

In testimony whereof I have signed my name to this specification.

JASPER BLACKBURN.